(12) United States Patent
Palik (10) Patent No.: US 8,322,665 B2
(45) Date of Patent: Dec. 4, 2012

(54) ALL-IN-ONE TRIPOD/MONOPOD

(76) Inventor: James Charles Palik, Nufringen (DE)

( * ) Notice: Subject to any disclaimer, the term of this patent is extended or adjusted under 35 U.S.C. 154(b) by 184 days.

(21) Appl. No.: 12/559,241

(22) Filed: Sep. 14, 2009

(65) Prior Publication Data
US 2011/0079686 A1    Apr. 7, 2011

(51) Int. Cl.
| F16M 11/38 | (2006.01) |
| F16M 11/26 | (2006.01) |
| F16M 11/24 | (2006.01) |
| A47G 23/02 | (2006.01) |
| A45D 19/04 | (2006.01) |
| G03B 17/00 | (2006.01) |

(52) U.S. Cl. ............ 248/166; 248/188.5; 248/173; 248/188.6; 248/150; 248/155.1; 248/155.5; 248/187.1; 396/419; 396/420; 396/428

(58) Field of Classification Search ............ 248/166, 248/188.5, 173, 188.6, 150, 155.1, 155.5, 248/187.1; 396/419, 420, 428
See application file for complete search history.

(56) References Cited

U.S. PATENT DOCUMENTS

| 4,317,552 | A | * | 3/1982 | Weidler | 248/168 |
| D280,908 | S | * | 10/1985 | Nakatani | D16/245 |
| 4,619,427 | A | * | 10/1986 | Leymann | 248/185.1 |
| 4,671,479 | A | * | 6/1987 | Johnson et al. | 248/173 |
| 4,744,536 | A | * | 5/1988 | Bancalari | 248/125.8 |
| 6,007,259 | A | * | 12/1999 | Mori et al. | 396/428 |
| 6,179,266 | B1 | * | 1/2001 | Hutten | 248/465 |
| 6,536,723 | B1 | * | 3/2003 | Nakatani | 248/163.1 |
| 6,572,060 | B2 | * | 6/2003 | Yoon | 248/163.1 |
| 7,845,602 | B1 | * | 12/2010 | Young et al. | 248/125.8 |
| 2004/0208498 | A1 | * | 10/2004 | McKay | 396/421 |
| 2007/0225131 | A1 | * | 9/2007 | Denike | 482/92 |

* cited by examiner

*Primary Examiner* — Terrell McKinnon
*Assistant Examiner* — Christopher Garft
(74) *Attorney, Agent, or Firm* — Donald R. Boys; Central Coast Patent Agency, Inc.

(57) ABSTRACT

The All-in-one Tripod/Monopod is single-shaft assembly with a base section located at the bottom and telescoping sections that form both a tripod and a monopod of unlimited height. The base is a section with three legs individually hinged at the bottom of the section. The legs can be pivoted independently. All legs pivoted downward form a tripod. All legs pivoted upward form a monopod. Minimum length and portability are provided when all sections are retracted and all legs are pivoted upward. Modularity allows sections to be individually added and removed so that they can be used in whole or in part. Modularity is provided for through a three position latch assembly. Both the top section of the shaft, and the tripod/monopod handle have a threaded screw for mounting a camera or other device. Individual sections, when detached, make special purpose monopods, chest pods, belt pods and extendable poles.

3 Claims, 7 Drawing Sheets

All-in-One Tripod/Monopod views

Figures 1, 2, 3:
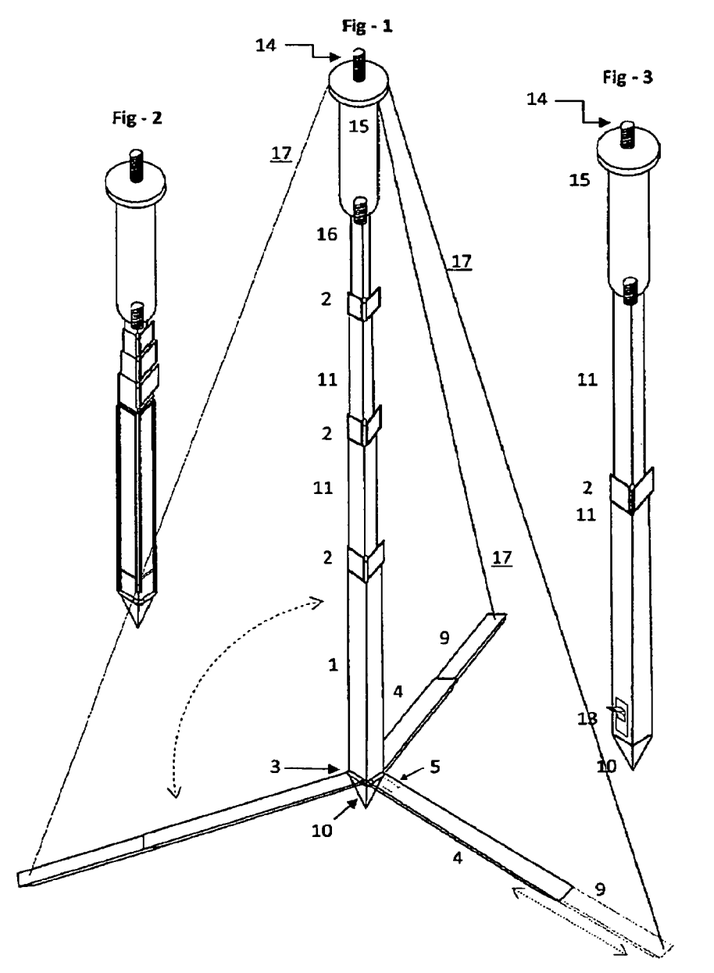

Fig-1 shows a fully extended tripod with the legs unfolded (folded outward).

Fig-2 shows a fully collapsed monopod where the legs are folded upward.

Fig-3 shows two extended sections that have been removed from the base section.

Drawings - Splined Hinge / Beveled Metal Tab Detail (side view)

Drawings - Splined Hinge / Beveled Metal Tab Detail (top view)

Fig - 19

Fig - 20

Drawings - Latch Assembly / Stopper Detail

ALL-IN-ONE TRIPOD/MONOPOD

BACKGROUND OF THE INVENTION

Most photographers use one of two devices for camera stabilization, a tripod or a monopod. A tripod is used when maximum stability is required allowing photographs to be taken with long exposures preventing camera shake. A monopod is used when either space prevents unfolding a tripod's legs or circumstances such as event photography in low light make a tripod inconvenient or impossible to use. These varying conditions require photographers to own and carry multiple camera stabilization devices.

Unfortunately, currently available tripods and monopods have legs of defined length and consequently are limited in their height by the length of the legs and provide no way of either adding or removing legs in real time/during use thereby changing the height.

Many photographers, especially travel photographers, who carry their equipment in a suitcase or a backpack require light weight, highly collapsible devices. Some photographers carry one or more tripods and monopods to insure the appropriate stabilization method is available with each providing different height requirements. Being required to carry multiple devices is both cumbersome and expensive.

SUMMARY OF THE INVENTION

The difference between the All-in-One Tripod/Monopod and traditional tripods and monopods is that the All-in-One Tripod/Monopod is a single device that (through its unique design) is both a tripod and monopod of unlimited height. While similar to traditional tripods consisting of a base and a telescoping shaft using multiple sections, the legs are connected directly to the bottom of the telescoping shaft (base section) instead of the top. When the legs are unfolded (folded outward), the device is a tripod. when the legs are folded upward the device is a monopod. This makes a single device that is a light weight, modular, and highly collapsible, tripod and monopod eliminating the need for multiple devices.

In addition to combining a tripod and monopod into a single device, through a unique three position latching system, the shaft sections can be detached or separated from each other. This further enhances the ability to control the devices height, weight, and portability. By adding and detaching sections. The height of the tripod and specialty monopods are created including a chest pod, belt pod, or an extendible poll.

SPECIFICATIONS

Base Detail

The base (1) is a single section with multiple legs (4) attached to a splined hinge (3) that is fastened to the bottom of the section (1). Each leg (4) can be pivoted independently. Each leg (4) has a single extension (9). The top of the base section (1) has a three position latch assembly (2) permanently attached for locking and releasing an inserted telescoping section (11). The bottom of the base section (1) has a hard-rubber section foot (10). The section foot (10) prevents slipping on, and scratching of smooth surfaces when the All-in-One Tripod/Monopod is being used as a monopod.

The base detail reference numbers refer to the drawings starting on page 12.

The base section (1) is a triangular tube allowing another section (11) to be inserted.

A rectangular hole (1a) just below the top of the section allows the stopper (13) of an inserted section to move into the hole (1a) preventing an inserted section (11) from coming out while being extended.

The three position latch assembly (2) is made of four parts; a frame (2a), a latch (2b), a pressure pad (2e) and a hinge (2c). The latch assembly (2) allows sections 11, 16) to be locked in position (position 1), extended and retracted (position 2), or removed (position 3). The latch assembly (2) is permanently attached to top of each section (1, 11, 16) by its frame (2a). When an inserted section's stopper (13) is in the parent section's rectangular hole (1a, 11a,), fully opening the latch (2b) allows the inserted section (11, 16) to be retracted or removed.

The latch assembly frame (2a) is permanently attached to the section.

The latch (2b) forms one side of the latch assembly. The latch (2b) has a long (wide) leg and a narrow short leg (2d) positioned to the left and in the middle of the wide leg.

The hinge (2c) that attaches the latch (2b) to the frame (2a).

The splined hinge (3) is fastened to the bottom of each side of the base section (1). The splined hinge (3), in combination with a beveled metal tab (5), allow tripod legs (4) to be attached and individually pivoted.

(FIG. 4) A tripod leg (4) attaches to a splined hinge (3) on each side of the base section (1). The legs (4) can then be pivoted independently. When the legs (4) are pivoted upward, the base becomes a monopod. When the legs (4) are pivoted outward the base becomes a tripod. The tripod legs (4) are a trapezoid shape. This provides strength and allows the legs (4) to blend with the base section (1) when pivoted upward.

(FIG. 5) shows a top-down view of the base section (1) with the legs (4) pivoted upward).

A rectangular hole (4a) on each side of a tripod leg (4) allows the tab grip (6) to protrude through the hole.

A beveled metal tab (5) is attached by two springs (7) one spring on each side of the splined hinge (3), at the end of each leg (4). The tab (5) has a beveled end that allows the leg (4) to move down but prevents it from moving up. The beveled metal tab (5) is pulled into each spline groove (3) by the springs (7) as the leg is pivoted outward. By pulling the beveled metal tab (5) out of the spline groove the leg (4) can pivot freely on the hinge (3).

The tab grip (6) is a flat piece that is attached the end of the beveled metal tab (5). The tab grip (6) protrudes through the rectangular holes on the top and bottom of a tripod leg (4). The tab grip is used to pull the beveled metal tab (5) out of the splined hinge allowing the tripod leg (4) to pivot freely, up or down on the hinge (3).

The springs (7) attach the beveled metal tab (5) to the splined hinge (3). The springs (7) pull the beveled metal tab (5) into a spline when the leg (4) is pivoted in the direction of the bevel.

A pin (8) extends through the end of the leg (4), the spring (7), and the splined hinge (3). The pin (8) attaches the leg to the splined hinge (3).

The tripod-leg extension (9) inserts into the tripod leg (4). When extended, the tripod-leg extension (9) increases tripod stability.

(FIG. 6) shows the tripod-leg extension hard-rubber, flanged end (9a). This prevents the tripod-leg extension (9) from being pushed in beyond the end of the tripod leg (4). The hard-rubber flanged end (9a) prevents slipping on, and scratching of smooth surfaces.

The section foot (10) is a triangular, hard-rubber three-sided inverse pyramid at the bottom of each section (1, 11, 16). When the All-in-One Tripod/Monopod is used as a monopod, the section foot (10) prevents the section from slipping on, and scratching of smooth surfaces.

Figures 4, 5, 6, 7, 8, 9:
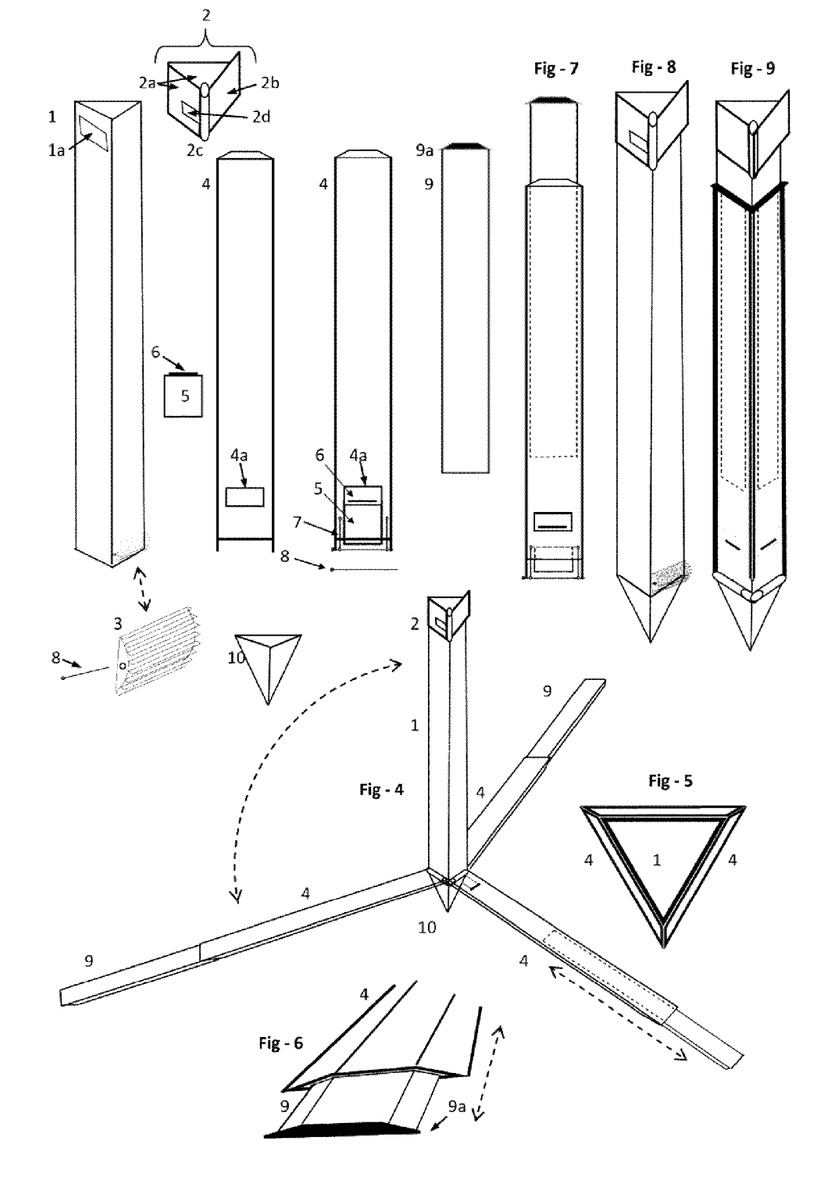

FIG. 4 shows the base (1) fully assembled with the legs (4) pivoted outward and the leg extensions (9) fully extended. This makes the base (1) a tripod.

FIG. 5 shows at top-down view of the base section (1) with the legs (4) pivoted upward and shows how the trapezoid shape of the legs (4) blend with the triangular design.

FIG. 6 shows the end of a tripod leg (4) with the tripod-leg extension (9) partially extended.

FIG. 7 shows a tripod leg (4) with the tripod-leg extension (9) inserted and partially extended. The beveled metal tab (5) is shown at the end of the leg (4).

FIG. 8 shows the base section (1) with the latch assembly (2), splined hinge (3), and section foot (10) attached.

FIG. 9 shows the base section (1) with the latch assembly (2), the legs (4) and the section foot (10) attached. The legs (4) are pivoted upward with the leg extensions (9) fully retracted.

Section Detail

Telescoping sections (11, 16) allow the height of the tripod/monopod shaft to be extended and retracted. Sections (1, 11, 16) have a parent child relationship. Each section (11), other than the base section (1) or the top section (16) can be either a parent or a child. The base section (1) can only be a parent, and the top section (16) can only be a child. The outside section is considered the parent 1, 11). A smaller section (11, 16) inserted into an outside section (parent) (1, 11) is the child. The modular design of the sections (11, 16) allows the sections to be used independently from the base section (1). This modularity allows the All-in-One Tripod/Monopod to accommodate many types of photography and shooting conditions.

The section detail reference numbers refer to the drawings starting on page 13.

Figures 10, 11, 12, 13:
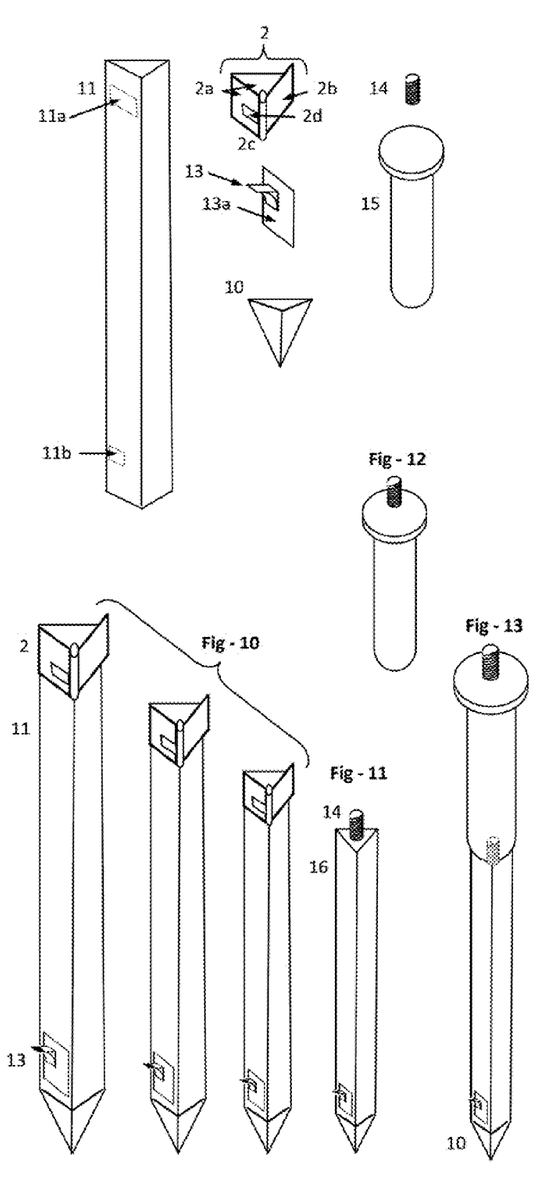

Each section (11) is similar in design to the base section. Each succeeding section (11) is reduced in size to allow it to be inserted into the previous (parent) section (FIG. 10). Each section (11) has two rectangular holes, one at the top (11a) and one at the bottom (11b). The bottom hole (11b) of each section (11, 16) allows a stopper (13), attached to spring-tempered metal (13a) and fastened inside the section (11, 16) behind the hole, to go through the hole. A second rectangular hole (11a), just below the top of the section (1, 11), allows the stopper (13) of an inserted (child) section (11, 16) to move into the hole preventing the child section (11, 16) from coming out of the parent section (1, 11) while being extended.

The rectangular hole (11b) at the bottom of a section (11, 16) allows a stopper that is permanently attached to the inside of the section to come through.

The latch assembly (2) allows sections (11, 16) to be locked in position, extended, retracted, or removed. The latch assembly (2) is permanently attached to the top of a section (1, 11). When an inserted section's stopper (13) is in the section's rectangular hole (11a), fully opening the latch (2b) allows the inserted section (11, 16) to be retracted or removed.

The latch assemble frame (2a) is permanently attached to a section (1, 11).

The latch (2b) forms one side of the latch assembly (2). The latch has a long (wide) leg (2b) and a narrow short leg (2d) positioned to the left and in the middle of the wide leg (2b). The hinge (2c) attaches the latch (2b) to the latch assembly frame.

The stopper (13) is attached to the left side of spring-tempered metal (13a). The stopper (13) is pushed into the rectangular hole (11a) at the top of its parent section (1, 11) by the tempered metal spring (13a) preventing the extension from coming out of its parent section (1, 11) while being extended.

The tempered metal tab (13a) to which the stopper (13) is attached allows the stopper (13) to bend back when its section (11, 16) is inserted into a parent section (1, 11) or when the short leg (2d) of the latch (2b) pushes the stopper (13) out the rectangular hole (11a) of a parent section (1, 11).

The section foot (10) is a triangular, hard-rubber, three-sided, inverse pyramid at the bottom of each section (1, 11, 16). When sections (1, 11, 16) are used as a monopod, the section foot prevents slipping and scratching of smooth surfaces.

A threaded screw (14) is used for mounting the tripod/monopod handle (15), camera or device, including—but not limited to—spotting scopes, binoculars, gun rests, and artificial lights. The screw (14) is attached to the top end of the top section (16) and to the top of the tripod/monopod handle (15).

Tripod/monopod handle (15) is made of hard rubber. The tripod/monopod handle (15) is cylindrical and provides a comfortable grip for holding and carrying the All-in-One Tripod/Monopod. The tripod/monopod handle (15) has a threaded screw (14) for mounting a camera or device, including—but not limited to—spotting scopes, binoculars, gun rests, and artificial lights. It has a threaded hole in on the bottom to attach it to the top section (16).

The top section (16) is similar to sections (1, 11) but does not have a latch assembly (2) attached or a rectangular hole (11a) at the top of the section. It has a threaded screw (14) permanently attached for mounting a tripod/monopod handle (15), a camera, or device, including—but not limited to—spotting scopes, binoculars, gun rests, and artificial lights.

FIG. 10 shows three sections (11). Each section (11) is similar in design. Each section (11) is reduced in size to allow it to be inserted into the previous section (1, 11). The latch assembly (2) which allows sections (11, 16) to be locked in position, extended and retracted, or removed is attached to top of each section (1, 11).

FIG. 11 shows the top section (16). The top section (16) has a threaded screw (14) for mounting the tripod/monopod handle (15). The lower side of the section has a stopper (13) attached to spring-tempered metal (13a) allowing the stopper to bend back when the section is inserted into a previous section (11). A section foot (10) is at the bottom of the section (16).

FIG. 12 shows the tripod/monopod handle (15) with the threaded screw (14) attached.

FIG. 13 shows the top section (16) with the tripod/monopod handle (15) attached. This single section (16) can be used as a chestpod.

Figure 14:
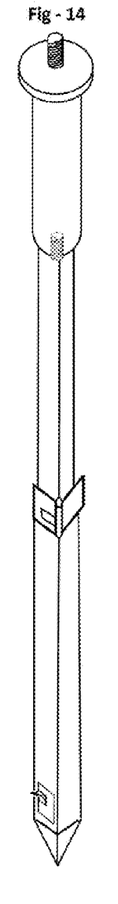

FIG. 14 shows the top two sections (11, 16) removed from the base (FIG. 4) and fully extended. This section combination (11, 16) can be used as a beltpod.

Figure 15:
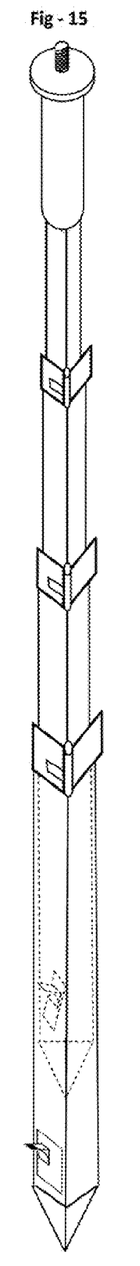

FIG. 15 shows all the sections (11, 16) removed from the base (FIG. 4). This makes a light-weight monopod.

Splined Hinge/Beveled Metal Tab Detail (Side View)

The splined hinge (3) and beveled metal tab (5) detail (side view) reference numbers refer to the drawings on page 14. Refer to previous descriptions for explanations of each part number.

Figures 16, 17, 18:
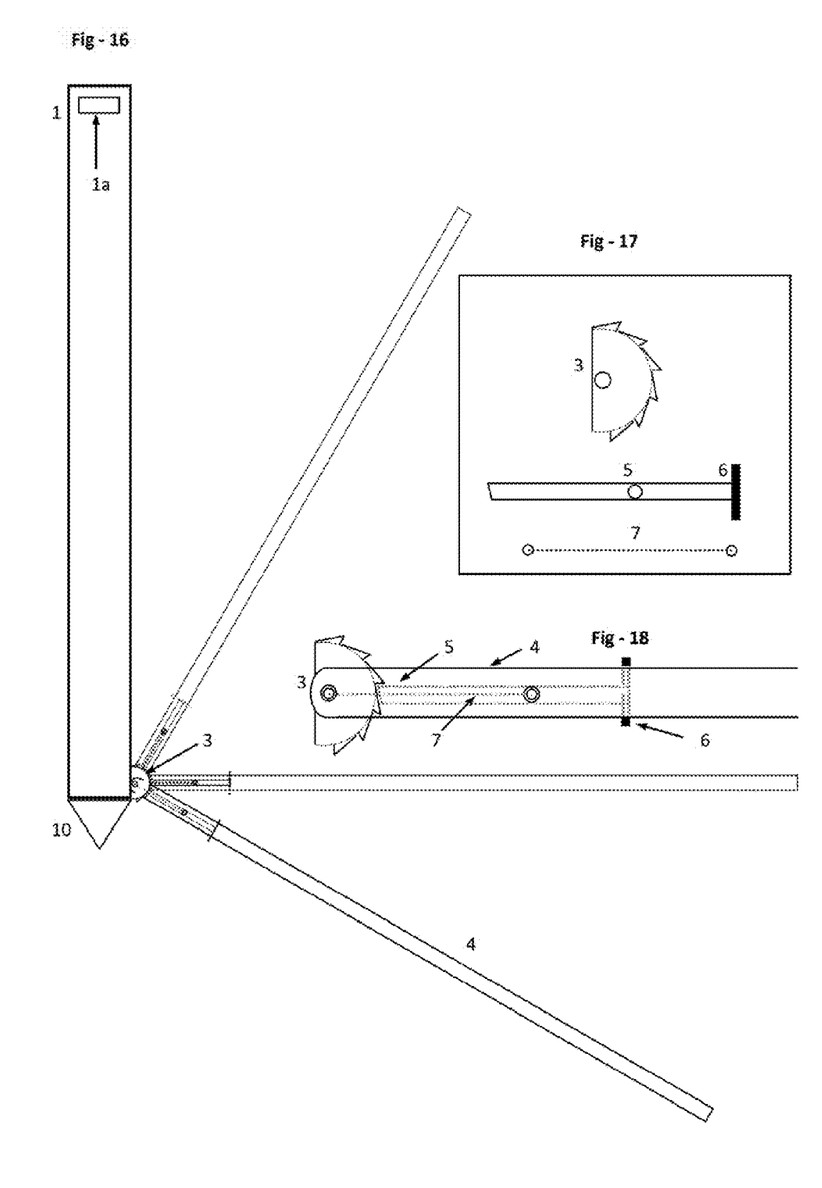

FIG. 16 shows a side view of the base extension (1) with a tripod leg (4) being pivoted at various angles. The leg (4) is attached to the splined hinge (3) at the bottom of the base section (1). The section foot (10) is attached.

FIG. 17 shows the splined hinge (3), beveled metal tab (5) with the tab grip (6) attached, and the spring (7) used to attach the beveled metal tab (5) to the splined hinge (3).

FIG. 18 shows a side view of the tripod leg (4) attached to the splined hinge (3) with the beveled metal tab (5) pulled into a spline by the spring (7). The tab grip (6) protrudes through the tripod leg (4).

Splined Hinge/Beveled Metal Tab Detail (Top View)

Refer to the drawings page 5.

Figures 19, 20:
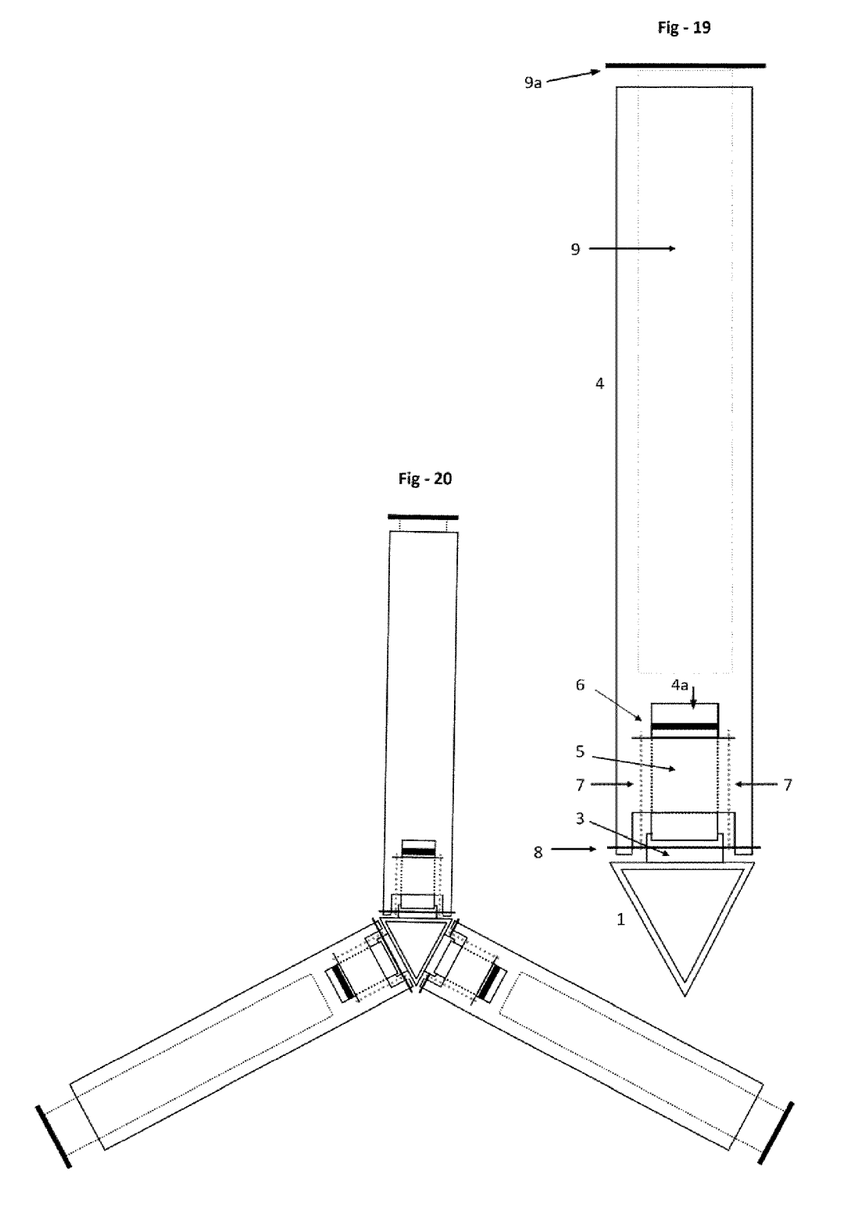

FIG. 19 shows a top view of a single tripod leg (4) pivoted outward and attached to the splined hinge (3) of the base section (1) by a pin (8). It shows how the bevel metal tab (5) is pulled into the splined hinge (3) by two springs (7) on each side of the beveled metal tab (5). It also shows the tripod-leg extension (9) inserted.

FIG. 19 illustrates three legs each having a tubular leg base portion of a substantially flat aspect, a length, and a width substantially equal to the width of the sides of the central base portion, each leg base portion having two extensions from a first end spaced apart spanning the width of one of the hinge blocks, and joined rotatably to the hinge block by pins forming an axis whereby each lag may pivot to lie adjacent to the side of the central base portion to which the each hinge block is attached.

FIG. 20 shows a top view of the base section (1) with all tripod legs (4) pivoted outward making a (tripod).

Latch Assembly/Stopper Detail

Refer to the drawings page 6.

Figure 21:
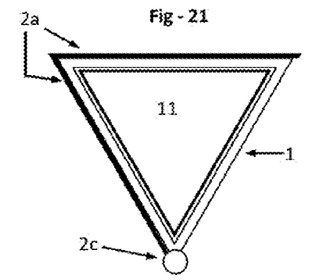

FIG. 21 shows a top view of the latch assembly (2). The latch assembly (2) is constructed from several parts: the frame (2a), latch wide side (2b), latch short narrow side (2d), latch hinge (2c), and pressure pad (2e).

The Latch (the Way the Latch Works)

The latch assembly (2) enables sections (11, 16) to be inserted, extended, retracted, or removed.

Figure 23:
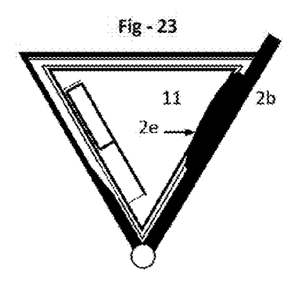

The latch (2b) has three positions:

FIG. 23 shows the latch (2b) closed for locking an inserted section 11, 16) in position.

Figure 24:
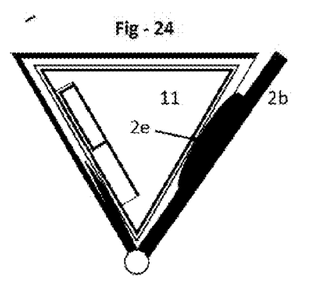

FIG. 24 shows the latch (2b) partially open for extending or retracting an inserted section 11, 16).

Figure 25:
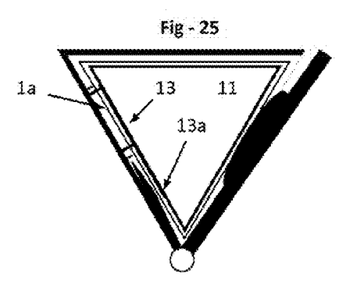

FIG. 25 shows the latch (2b) when a section (11, 16) is fully extended and the stopper (13) is in the rectangular hole (1a, 11a) preventing the section (11, 16) from being removed.

Figure 26:
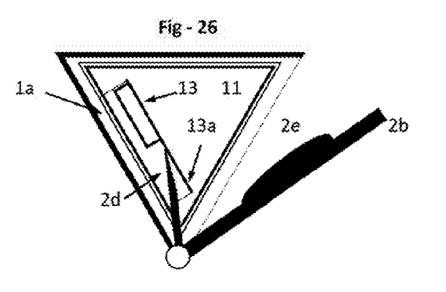

FIG. 26 shows the latch (2b) fully open for removing a section (11, 16) or allowing a fully extended section (11, 16) to be retracted (FIG. 26).

FIGS. 21-30 illustrate the way the latch assembly (2) attaches to sections, each of the three latch (2b) positions, and how the stopper (13) is positioned inside the bottom of each section (11, 16).

FIG. 21 shows the latch frame (2a) is permanently attached to the outside top of a parent section (1, 11). It extends above the parent section (1, 11), (FIGS. 27 and 28), to allow the pressure pad (2e) to press against an inserted child section (11, 16), when the latch is closed (FIG. 23), locking the child section (11, 16) in place. The pressure pad (2e) may press directly against the child section (11, 16) or against a separate intermediate plate (not illustrated) to lock the child section (11, 16).

Each section (1, 11) has a rectangular hole (1a, 11a) at the top of the section (1, 11). The rectangular hole (1a, 11a) allows a stopper (13), that is permanently attached to the inside bottom of each child section (11, 16), to be pushed into the rectangular hole (1a, 11a) when the child section (11, 16) is fully extended. This prevents child sections (11, 16) from coming out of their parent sections (1, 11) during use.

FIG. 26 shows a fully opened latch (2b) and how the short narrow side of the latch (2d) pushes the stopper (13) back, out of the rectangular hole (1, 11a), allowing the child section (11, 16) to be retracted or removed from the parent section (1, 11).

FIGS. 21-26 show the latch assembly (2) and stopper (13) detail.

FIG. 21 the latch frame (2a) is permanently attached to the outside top of a parent section (1, 11).

This top-down view also shows a child section (11) inserted. The left side of the latch frame has a rectangular slot to allow the short narrow side of the latch (2d) to fit flush with the latch frame.

Figure 22:
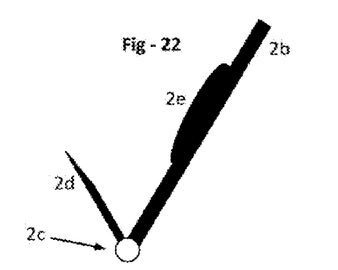

FIG. 22 This top-down view shows the complete latch: latch wide side (2b), latch short narrow side (2d), latch hinge (2c), and pressure pad (2e). The latch is attached to the frame by a latch hinge (2c).

The pressure pad (2e) is permanently attached to the inside and toward the top of the latch wide side (2b). The latch short-narrow side (2d) and the latch wide side (2b) are a single part with the latch hinge (2c) in the middle.

Figures 22A, 22B:
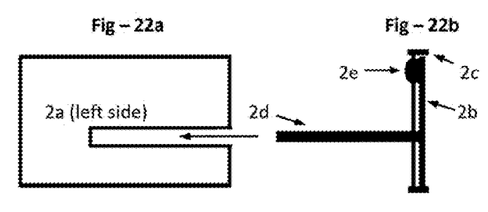

FIG. 22a shows the side view of the left side of the latch frame (2a) that has a rectangular slot to allow the short narrow side of the latch (2d) to fit flush with the latch frame when positioned over the rectangular hole (1a, 11a).

FIG. 22b shows a side view of the short narrow side (2d) of the latch (2b). The position of the short narrow side (2d) of the latch (2b) is located is over the rectangular hole of the section (1, 11).

(FIG. 27) also shows a side view of the short narrow side (2d) of the latch (2b). The position of the short narrow side (2d) of the latch (2b) is located is over the rectangular hole of the section (1, 11). This allows the short narrow side of the latch (2d) to push back the stopper (13) when a child section (11, 16) is fully extended.

Figure 22C:
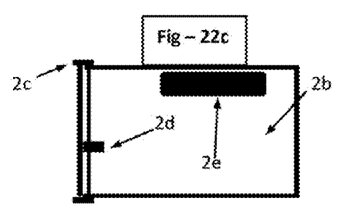

FIG. 22c shows the side view of the wide side (2b) of the latch. It also shows the pressure pad (2e) attached to the inside and toward the top of the latch wide leg (2b).

FIG. 23 shows a top-down view of the latch (2b) closed. When the latch (2b) is closed, pressure is applied to the child section (11, 16) by a pressure pad (2e) locking the child section (11, 16) in place against the parent section 1, 11). In this view a child section (11, 16) is fully inserted in a parent section (1, 11) and the stopper (13) is pressed against the inside of the parent section 1, 11).

FIG. 24 shows a top-down view of the latch (2b) partially opened. When the latch (2b) is partially opened pressure against the child section (1, 11) is removed and the section (11, 16) can be fully extended and retracted. In this view, the stopper (13) remains pressed against the inside of the parent section (1, 11).

FIG. 25 shows a top-down view of the stopper (13) when a section (11, 16) is fully extended. When a section (11, 16) is fully extended, a stopper (13) attached to spring-tempered metal (13a) located inside the bottom of the child section (11, 16), is pushed into the rectangular hole (1a, 11a) at the top of the parent section (1, 11). This prevents the child section (11, 16) from coming out of its parent section (1, 11. The latch (2b) is shown as partially open.

FIG. 26 Shows a top-down view of the latch (2b) fully open with the stopper (13) pushed back. When a child section (11, 16) is fully extended, by fully opening the latch (2b), the stopper (13) is pushed out of the parent section (1, 11) rectangular hole (1a, 11a) by the latch short narrow side (2d) pushing the spring-tempered metal (13a) back allowing the child section (11, 16) to be retracted or removed.

Figure 27:
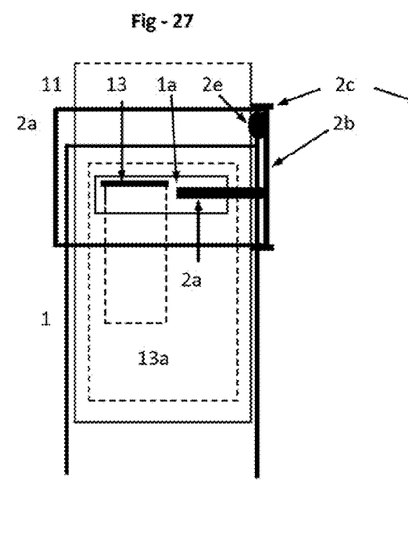

FIG. 27 shows a side view of the top of a parent section (1, 11), from the short narrow side (1d) of the latch (2b). An inserted child section (11, 16) is fully extended and the stopper (13) is pushed in the rectangular hole (1a, 11a). The latch assembly shows the short narrow side (2d) of the latch (2b) in front of the rectangular hole (1a, 11a).

Figure 28:
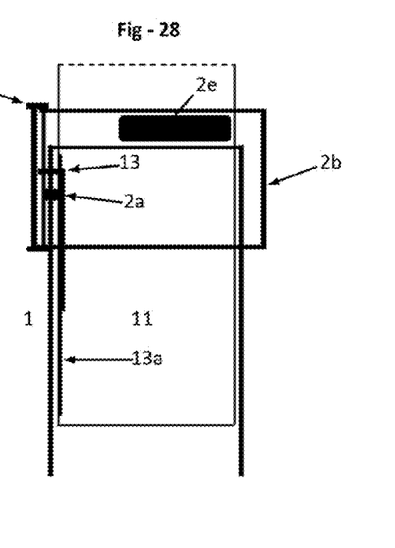

FIG. 28 shows a side view of the top of a parent section (1, 11), from the wide side of the latch (2b). An inserted child section (11, 16) is fully extended and the stopper (13) is pushed in the rectangular hole (1a, 11a).

The wide side of the latch (2b) is slightly wider than the side of the parent section (1, 11) to provide a finger-hold to allow the latch (2b) to be opened.

Figure 29:
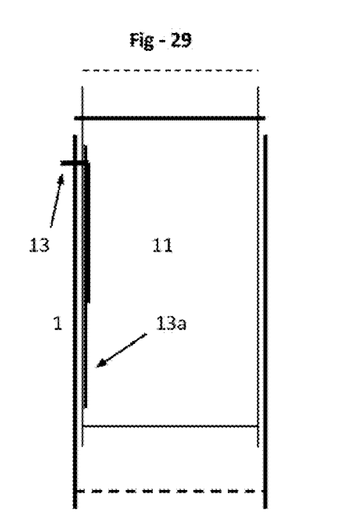

FIG. 29 shows a side view of the top of a parent section (1, 11) and the bottom of a child section (11, 16) (with the child section (11, 16) fully extended. The stopper (13) attached to the inside of the child section (11, 16) is in the rectangular hole (1a, 11a) of the parent section (1, 11).

Figure 30:
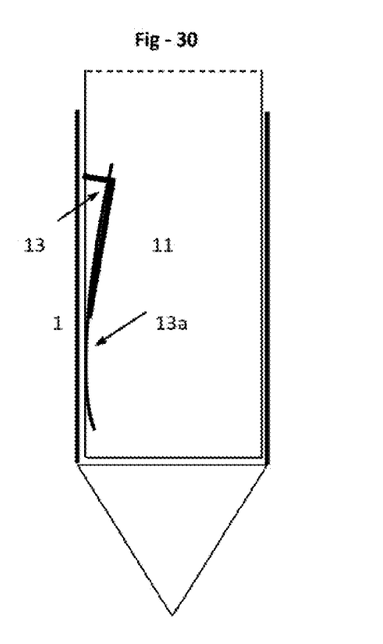

FIG. 30 shows a side view of the bottom of a parent section (1, 11) and the bottom of a child section. The child section (11, 16) is inside the parent section (1, 11) and the stopper (13) pushed back inside the parent section (1, 11).

The invention claimed is:

1. A dual-mode device support, comprising:

an elongated tubular central base portion having a length and an equilateral triangular cross-section shape defining three sides of equal width joined along three edges in the direction of the length, the base portion having a rectangular opening through one side proximate a first end;

three splined hinge blocks, one each fastened securely to each of the three sides of the central base portion at a second end opposite the first end, each of the hinge blocks having a width less than the width of the side to which it is attached, and each hinge block presenting multiple splines outwardly in a circular pattern angled downward;

at least one tubular central extension portion having an equilateral triangular cross-section smaller than that of the central base portion, inserted into the central base portion from the first end of the central base portion, the central extension portion having a rectangular stopper opening proximate an end first inserted into the central base portion, and a stopper element joined to a cantilevered spring element fasted to an inside wall of the extension portion, such that the stopper element normally extends through the stopper opening, but is retractable against the spring force of the cantilevered spring element, such that with the central extension portion fully extended from the central base portion the stopper element extends through the stopper opening and into the rectangular opening proximate the first end of the central base portion, preventing the extension portion from disengaging completely from the central base portion, unless the stopper element is urged out of the rectangular opening in the central base portion;

a locking mechanism at the first end of the central base portion, the locking mechanism comprising a first flat side securely joined to one side of the central base portion, covering a first portion of the rectangular opening proximate the first end of the central base portion, and having an operating opening positioned to align with a second portion of the rectangular opening proximate the first end of the central base portion, a second flat side joined to the first flat side along one edge of the central base portion such that the second flat side lies adjacent to a second side of the central base portion, but is not joined to the second side of the central base portion, the second flat side along one edge extending beyond the first end of the central base portion and having a friction pad directed inwardly, such that the friction pad is normally urged against a side of the inserted extension portion, the locking mechanism further comprising a rotatable leg normally positioned over the operating opening of the first flat side and joined by a hinge collinear with the edge along which the first and second flat sides are joined to the first flat side, the locking mechanism by virtue of construction and placement having three operating positions: (i) a normal position wherein the pressure pad is urged against a side of the extension portion regardless of the extent of extension, holding the extension portion and the base portion together, (ii) a first operating position at which an operator rotates the second flat side away from the adjacent side of the base portion just enough to release the friction pad so the extension portion may be further extended or retracted, and (iii) a second operating position wherein the extension portion is fully extended with the stopper element urged through the stopper opening and preventing the extension portion from becoming fully removed from the base portion, wherein the operator, by rotating the second flat side further than the first operating position, causes the rotatable leg to bear against and deflect the cantilevered spring element, causing the stop element to retract to a point wherein the extension element is fully removable from the base portion;

a male threaded interface at an end of the extension portion away from the central base portion, engaging a cylindrical handle portion at one end, the cylindrical handle portion having a male threaded interface at an opposite end for engaging a female threaded interface of a device to be supported;

three legs each having a tubular leg base portion of a substantially flat aspect, a length, and a width substantially equal to the width of the sides of the central base portion, each leg base portion having two extensions from a first end spaced apart spanning the width of one of the hinge blocks, and joined rotatably to the hinge block by pins forming an axis whereby each leg pivots to lie adjacent to the side of the central base portion to which each hinge block is attached;

a spring-loaded tab with an operating lever, the tab guided within each leg base portion, presenting the tab toward the splines of the splined hinge block with a force, the tab having an angled face such that the tab rides over the downwardly-angled splines as a leg is rotated away from the central base portion, but prevents the leg from rotating toward the central base portion unless the operator withdraws the spring loaded tab by the operating lever;

a telescoping extension from each one of the three tubular leg base portions, enabled to extend from an end of each leg base portion away from the end attached to the splined hinge block, such that each leg is extendable to a different length; and a foot element rigidly attached to the central base portion at the second end, the foot element having the cross-section shape and area of the central base portion where attached to the central base portion, and exhibiting a diminishing area with the same shape extending away from the central base portion.

2. The dual-mode device support of claim 1 wherein the foot comprises a rubber-like material.

3. The dual-mode device support of claim 2 wherein the foot cross-section area diminishes to substantially a point at the end away from the central base portion.

\* \* \* \* \*